United States Patent
Paek et al.

(10) Patent No.: US 10,566,898 B1
(45) Date of Patent: Feb. 18, 2020

(54) NEGATIVE VOLTAGE CIRCUIT

(71) Applicant: SAMSUNG ELECTRO-MECHANICS CO., LTD., Suwon-si (KR)

(72) Inventors: Hyun Paek, Suwon-si (KR); Byeong Hak Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/438,602

(22) Filed: Jun. 12, 2019

(30) Foreign Application Priority Data

Nov. 13, 2018 (KR) .................. 10-2018-0139327

(51) Int. Cl.
  *H02M 3/07*   (2006.01)
  *G05F 1/10*   (2006.01)
  *H02M 3/335*  (2006.01)

(52) U.S. Cl.
  CPC ....... *H02M 3/073* (2013.01); *H02M 3/33507* (2013.01)

(58) Field of Classification Search
  CPC .. H02M 3/07; H02M 3/073; H02M 2003/071; H02M 2003/072; H02M 2003/075; H02M 2003/076; H02M 2003/077
  See application file for complete search history.

(56) References Cited

U.S. PATENT DOCUMENTS

| | | | | |
|---|---|---|---|---|
| 8,674,750 B2 * | 3/2014 | Lee | ............ | H02M 3/073 327/536 |
| 9,209,681 B2 * | 12/2015 | Chern | ............ | H02M 1/36 |
| 10,250,235 B2 * | 4/2019 | Najafi | ............ | H02M 7/217 |
| 10,340,794 B1 * | 7/2019 | Zhang | ............ | H02M 1/36 |
| 2003/0057469 A1 | 3/2003 | Karaki | | |

FOREIGN PATENT DOCUMENTS

JP    2003-45193 A    2/2003

* cited by examiner

*Primary Examiner* — Kenneth B Wells
(74) *Attorney, Agent, or Firm* — NSIP Law

(57) ABSTRACT

A negative voltage circuit comprises an inverter circuit that performs a charging operation and a discharging operation, a first dual current circuit supplying a first current for a charging operation of the inverter circuit based on a start-up mode, and a second current for the charging operation of the inverter circuit based on a normal operating mode, a second dual current circuit supplying a third current for a discharging operation of the inverter circuit based on the start-up mode, and a fourth current for the discharging operation of the inverter circuit based on the normal operating mode, a load switching circuit that connects an output node of the inverter circuit to one of an output terminal of a negative voltage circuit and the second operating voltage terminal, and a load capacitor circuit connected between the output terminal and a ground to stabilize a negative voltage at the output terminal.

18 Claims, 10 Drawing Sheets

NEGATIVE VOLTAGE CIRCUIT

CROSS-REFERENCE TO RELATED APPLICATION(S)

This application claims the benefit under 35 USC § 119(a) of Korean Patent Application No. 10-2018-0139327 filed on Nov. 13, 2018 in the Korean Intellectual Property Office, the entire disclosure of which is incorporated herein by reference for all purposes.

BACKGROUND

1. Field

The following description relates to a negative voltage circuit applicable to a radio-frequency switch circuit.

2. Description of Related Art

Typically, a radio-frequency (RF) switch device may need a negative voltage to improve isolation characteristics. The negative voltage may be generated by a negative voltage circuit. As an example, the negative voltage circuit may implement a negative charge pump.

Typically, a negative voltage charge pump may include an inverter and a charge capacitor. In the negative voltage charge pump, a time that a negative voltage charge pump may take to reach a target voltage, and the magnitude of a loading current, may be determined based on a size of the inverter and a size of the charge capacitor.

As an example, the larger a size of the inverter, the more currents may be allowed to flow. The higher the capacitance of the charge capacitor, the more charges may be controlled. Accordingly, a target voltage may be reached more rapidly and high currents may be loaded.

In the typical negative voltage charge pump, more current loading may be needed when the charge pump operates first and when input power is high. Otherwise, more current loading may not be needed.

However, when the typical negative voltage charge pump is set to be appropriate to additional current loading in the early stage, considerable power may be consumed during operation of the charge pump. Meanwhile, when the negative voltage charge pump is set to be appropriate to less current loading during a normal operation, initial loading time may be increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a negative voltage circuit includes an inverter circuit configured to perform a charging operation and a discharging operation in response to a driving signal, a first dual current circuit connected between the inverter circuit and a first operating voltage terminal, and configured to supply a first current for a charging operation of the inverter circuit based on a start-up mode, and supply a second current for the charging operation of the inverter circuit based on a normal operating mode, a second dual current circuit connected between the inverter circuit and a second operating voltage terminal, and configured to supply a third current for a discharging operation of the inverter circuit based on the start-up mode, and supply a fourth current for the discharging operation of the inverter circuit based on the normal operating mode, a load switching circuit configured to connect an output node of the inverter circuit to one of an output terminal of a negative voltage circuit and the second operating voltage terminal based on the driving signal, and a load capacitor circuit connected between the output terminal of the negative voltage circuit and a ground, and configured to stabilize a negative voltage at the output terminal.

The inverter circuit may include a first switching element, connected between the first dual current circuit and a middle node, and configured to operate in response to the driving signal, a second switching element, connected between the middle node and the second dual current circuit, and configured to operate with the first switching element in response to the driving signal, and a charge capacitor connected between the middle node and the output node of the inverter, and configured to perform the charging operation when the first switching element is in an ON state, and configured to perform the discharging operation when the second switching element is in an ON state.

The first dual current circuit includes a first start-up mode switch, connected between the first operating voltage terminal and the first switching element, and configured to enter an ON state during the charging operation in the start-up mode to supply the first current to the inverter circuit, and a first operating mode switch, connected in parallel to the first driving mode switch, and configured to enter an ON state during the charging operation in the normal operating mode to supply the second current to the inverter circuit, wherein the second current is lower than the first current.

The second dual current circuit may include a second start-up mode switch, connected between the second switching element and the second operating voltage terminal, and configured to enter an ON state during the discharging operation in the start-up mode to supply the third current between the inverter circuit and the second operating voltage terminal, and a second normal operating mode switch, connected in parallel with the second start-up mode switch, and configured to enter an ON state during the discharging operation in the normal operating mode to supply the fourth current between the inverter circuit and the second operating voltage terminal, wherein the fourth current is lower than the third current.

The load switching circuit may include an output switch connected between the output node of the inverter circuit and the output terminal, and configured to enter an ON state during the charging operation, and a ground switch connected between the output node of the inverter circuit and the second operating voltage terminal, and configured to enter an ON state during the charging operation.

The load capacitor circuit may include a load capacitor connected between the output terminal and a ground, and is configured to stabilize a negative voltage at the output terminal.

Each of the output switch of the load switching circuit and the ground switch of the load switching circuit may include one of a Metal-oxide Semiconductor (MOS) transistor and a diode.

In a general aspect, a negative voltage circuit includes an inverter circuit configured to perform a charging operation and a discharging operation in based on a driving signal, a first dual current circuit connected between the inverter circuit and a first operating voltage terminal, and configured to supply a first current for a charging operation of the inverter circuit based on a start-up mode, and supply a second current for the charging operation of the inverter circuit based on a normal operating mode, a second dual current circuit connected between the inverter circuit and a second operating voltage terminal to and configured to supply a third current for a discharging operation of the inverter circuit based on the start-up mode, and supply a fourth current for the discharging operation of the inverter circuit based on the normal operating mode, a load switching circuit configured to connect an output node of the inverter circuit to one of an output terminal of a negative voltage circuit and the second operating voltage terminal based on the driving signal, a load capacitor circuit connected between the output terminal of the negative voltage circuit and a ground, and configured to stabilize a negative voltage at the output terminal, and an operating mode control circuit configured to control the first dual current circuit and the second dual current circuit in response to the negative voltage at the output terminal.

The inverter circuit may include a first switching element, connected between the first dual current circuit and a middle node, and configured to operate in response to the driving signal, a second switching element, connected between the middle node and the second dual current circuit, and configured to operate with the first switching element in response to the driving signal, and a charge capacitor connected between the middle node and the output node of the inverter, and configured to perform the charging operation when the first switching element is in an ON state, and configured to perform the discharging operation when the second switching element is in an ON state.

The first dual current circuit may include a first start-up mode switch, connected between the first operating voltage terminal and the first switching element, and configured to enter an ON state in response to the driving signal during the charging operation in the start-up mode to supply the first current to the inverter circuit; and a first operating mode switch, connected in parallel to the first driving mode switch, and configured to enter an ON state in response to the driving signal during the charging operation in the normal operating mode to supply the second current to the inverter circuit, wherein the second current is lower than the first current.

The second dual current circuit may include a second start-up mode switch, connected between the second switching element and the second operating voltage terminal, and configured to enter an ON state in response to the driving signal during the discharging operation in the start-up mode to supply the third current between the inverter circuit and the second operating voltage terminal, and a second normal operating mode switch, connected in parallel with the second start-up mode switch, and configured to enter an ON state in response to the driving signal during the discharging operation in the normal operating mode to supply the fourth current between the inverter circuit and the second operating voltage terminal, wherein the fourth current is lower than the third current.

The load switching circuit may include an output switch connected between the output node of the inverter circuit and the output terminal, and configured to enter an ON state during the charging operation, and a ground switch connected between the output node of the inverter circuit and the second operating voltage terminal, and configured to enter an ON state during the charging operation.

The load capacitor circuit may include a load capacitor connected between the output terminal and a ground, and is configured to stabilize a negative voltage at the output terminal.

The operating mode control circuit may be configured to compare the negative voltage at the output terminal with a first reference voltage and a second reference voltage, each of the first reference voltage and the second reference voltage having different voltage levels to each other, generate a first control signal and a second control signal, out-of-phase signals, and provide the first control signal and the second control signal to the first dual current circuit and the second dual current circuit to control the start-up mode and the normal operating mode.

The operating mode control circuit may include a comparison circuit configured to generate a first control signal that transitions from a low level to a high level when the negative voltage is greater than or equal to the first reference voltage, and that transitions from a high level to a low level when the negative voltage is less than or equal to the second reference voltage, and an inversion circuit configured to invert the first control signal to generate the second control signal.

Each of the output switch and the ground switch of the load switch circuit may include any one of a Metal-oxide Semiconductor (MOS) transistor and a diode.

In a general aspect, a negative voltage circuit includes an oscillator configured to provide a driving signal, a first dual current circuit configured to supply a first current to perform a charging operation based on a start-up mode and supply a second current to perform the charging operation based on a normal operation mode, a second dual current circuit configured to supply a third current to perform a discharging operation based on the start-up mode, and supply a fourth current to perform the discharging operation based on the normal operation mode, and an operating mode controlling circuit comprising a hysteresis comparator configured to generate a first control signal, and an inversion circuit configured to generate a second control signal based on the first control signal, wherein the first control signal and the second control signal are provided to the first dual current circuit and the second dual current circuit to control the start-up mode and the normal operation mode.

The first control signal transitions from a low level to a high level when a negative voltage is greater than or equal to a first reference voltage, and transitions from a high level to a low level when the negative voltage is less than or equal to a second reference voltage.

Other features and aspects will be apparent from the following detailed description, the drawings, and the claims.

Figure 1:
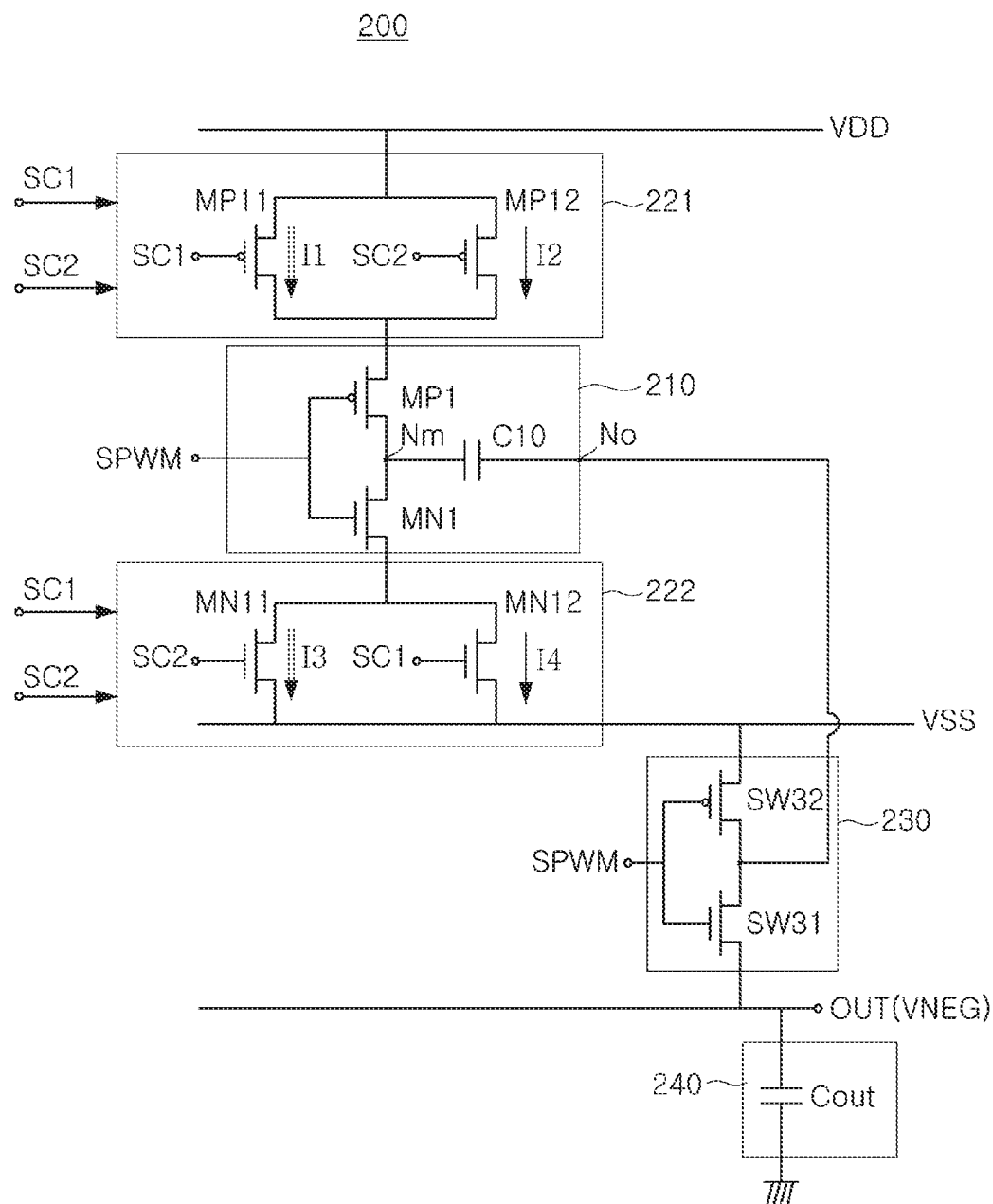
FIG. 1 is a circuit diagram of a negative voltage circuit in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Figure 2:
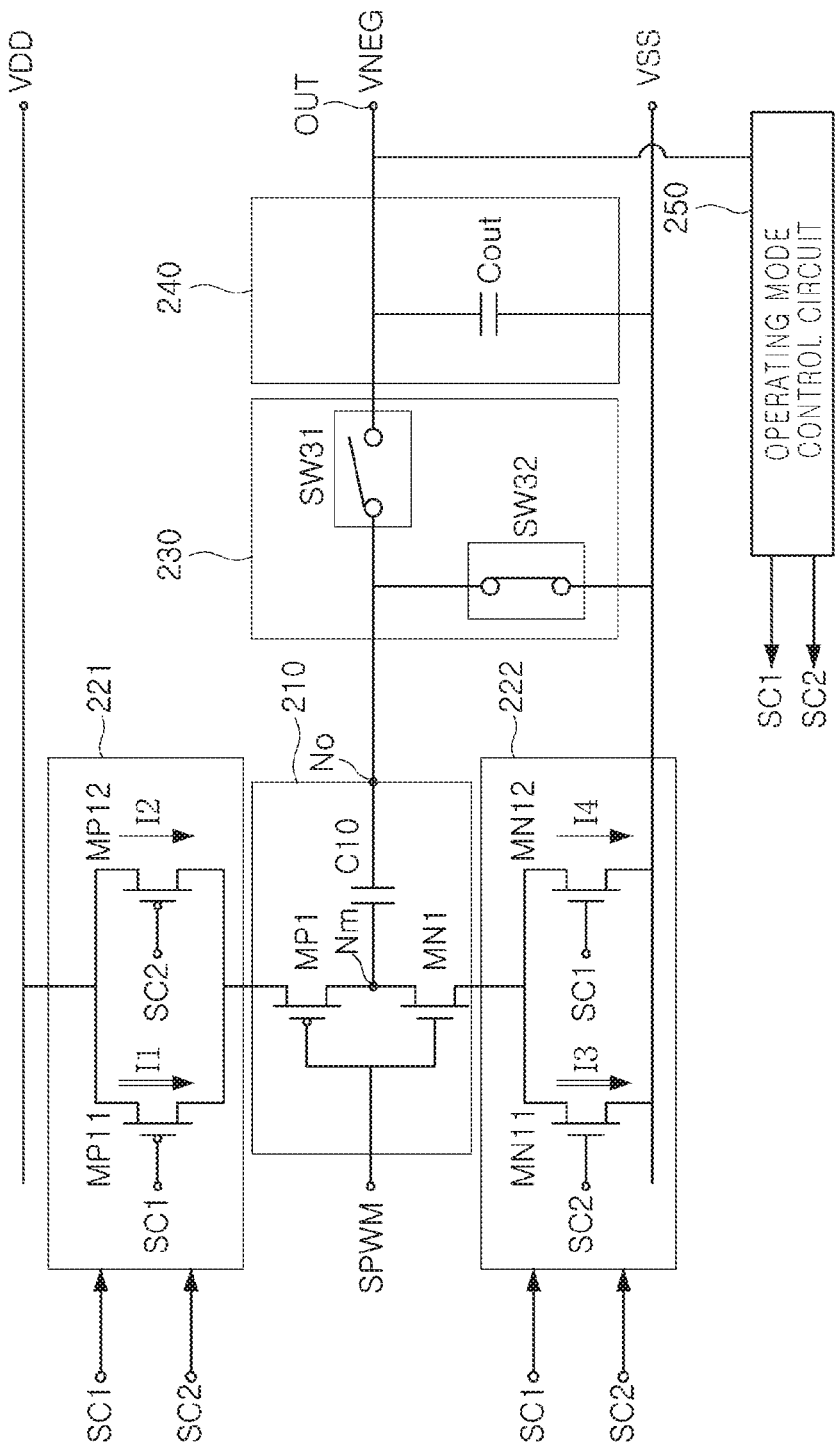
FIG. 2 is a circuit diagram of a negative voltage circuit in accordance with one or more embodiments.

FIG. 1 is an example of a circuit diagram of a negative voltage circuit in accordance with one or more embodiments, and FIG. 2 is a circuit diagram of a negative voltage circuit in accordance with one or more embodiments.

Referring to FIGS. 1 and 2, a negative voltage circuit may include an inverter circuit 210, a first dual current circuit 221, a second dual current circuit 222, a load switching circuit 230, and a load capacitor circuit 240.

The inverter circuit 210 may perform a charging operation, a discharging operation, which are complementary operations, in response to a driving signal SPWM. For example, the driving signal SPWM may be any one of a pulse signal in which a high level and a low level are repeated, a PWM (Pulse Width Modulation) signal, and an oscillation signal. Hereinafter, for ease of description, the driving signal SPWM will be referred to as a PWM signal.

The first dual current circuit 221 may be connected between the inverter circuit 210 and a first operating voltage (for example, VDD) terminal to supply different currents for a charging operation of the inverter circuit 210, depending on a start-up mode and a normal operation mode, during the charging operation. As an example, first current I1, which may be higher than second current I2, may be supplied in the start-up mode, while the second current I2, which may be lower than the first current I1, may be supplied in the normal operating mode. As an example, the first operating voltage VDD (drain power supply voltage) may be a voltage of +2.5 volts.

The second dual current circuit 222 may be connected between the inverter circuit 210 and a second operating voltage (for example, VSS) terminal to allow different currents to flow for a discharging operation of the inverter circuit 210, depending on the start-up mode and the normal operation mode, during the discharging operation. As an example, third current I3, which may be higher than fourth current I4, may be supplied in the start-up mode, while the fourth current I4, which may be lower than the third current I3, may be supplied in the normal operating mode. As an example, the second operating voltage VSS (source power supply Voltage) may be a voltage of 0 volt. However, this is only an example, and the second operating voltage VSS may be a voltage other than 0 volt.

The load switching circuit 230 may connect an output node No of the inverter circuit 210 to one of an output terminal OUT of the negative voltage circuit and the second operating voltage (for example, VSS) terminal, in response to the driving signal SPWM.

The load capacitor circuit 240 may be connected between the output terminal OUT of the negative voltage circuit, and a ground to stabilize a negative voltage VNEG at the output terminal OUT.

Referring to FIG. 2, as compared to the negative voltage circuit illustrated in FIG. 1, a negative voltage circuit according to an example may further include an operating mode control circuit 250.

The operating mode control circuit 250 may generate respective first and second control signals SC1 and SC2 depending on the negative voltage VNEG at the output terminal OUT, and may control the first and second dual current circuits 221 and 222 based on the respective first and second control signals SC1 and SC2.

In the drawings of the present disclosure, the same elements will be denoted by the same reference numerals, and descriptions will be given below with a focus on differences.

Hereinafter, the inverter circuit 210 will be described in further detail with reference to FIGS. 1 and 2. The inverter circuit 210 may include a first switching element MP1, a second switching element MN1, and a charge capacitor C10.

In a non-limiting example, the first switching element MP1 may be connected between the first dual current circuit 221 and a middle node Nm, and may perform a switching operation in response to the driving signal SPWM.

The second switching element MN1 may be connected between the middle node Nm of the inverter circuit 210 and the second dual current circuit 222, and may perform a switching operation complementarily with the first switching element MP1 in response to the driving signal SPWM. As an example, during a charging operation, the first switching element MP1 may enter an ON state while the second switching element MN1 may enter an OFF state. During a discharging operation, the first switching element MP1 may enter an OFF state while the second switching element MN1 may enter an ON state.

The charge capacitor C10 may be connected between the middle node Nm of the inverter circuit 210 and the output node No of the inverter circuit 210, and may perform the charging operation when the first switching element MP1 is in an ON state and may perform the discharging operation when the second switching element MN1 is an ON state.

The first dual current circuit 221 may include a first start-up mode switch MP11 and a first normal operating mode switch MP12. As an example, each of the first start-up mode switch MP11 and the first normal operating mode switch MP12 may be a p-channel Metal-Oxide Semiconductor (PMOS) transistor, but are not limited thereto. The first start-up mode switch MP11 may be a Metal-oxide Semiconductor (MOS) transistor, having a size larger than a size of the first normal operation mode switch MP12, to supply the first current I1, which may be higher than second current I2, generated by the first normal operation mode switch MP12.

The first start-up mode switch MP11 may be connected between the first operating voltage (for example, VDD) terminal and the first switching element MP1 of the inverter circuit 210, and may enter an ON state during the charging operation in the start-up mode to supply the first current I1 to the inverter circuit 210.

The first normal operating node switch MP12 may be connected in parallel with the first start-up mode switch MP11, and may enter an ON state during the charging operation in the normal operation mode to supply the second current I12, which may be lower than the first current I1, to the inverter circuit 210.

As an example, when the first current I1 is higher than the second current I2, higher-speed charging may be performed in the start-up mode.

The second dual current circuit 222 may include a second start-up mode switch MN11 and a second normal operating mode switch MN12. As an example, each of the second start-up mode switch MN11 and the second normal operation mode switch MN12 may be an NMOS transistor, but are not limited thereto. The first start-up mode switch MP11 may be a MOS transistor, having a size larger than a size of the first normal operation mode switch MP12, to supply the first current I1, which may be higher than the second current I2, to the first normal operating mode switch MP12.

The second start-up mode switch MN11 may be connected between the second switching element MN1 of the inverter circuit 210 and the second operation voltage (for example, VSS) terminal, and may enter an ON state during the discharging operation in the start-up mode to supply a third current I3, which may be higher than a fourth current I4, between the inverter circuit 210 and the second operating voltage (for example, VSS) terminal.

The second normal operating mode switch MN12 may be connected in parallel with the second start-up mode switch MN11, and may enter an ON state during the discharging operation in the normal operating mode to supply the fourth current I4, which may be lower than the third current I3, between the inverter circuit 210 and the second operating voltage (for example, VSS) terminal.

As an example, when the third current I3 is higher than the fourth current I4, higher-speed discharging may be performed in the start-up mode.

The load switching circuit 230 may include an output switch SW31 and a ground switch SW32. As a non-limiting example, the output switch SW31 may be an NMOS transistor and the ground switch SW32 may be a PMOS transistor.

The output switch SW31 may be connected between the output node No of the inverter circuit 210 and the output terminal OUT to enter an ON state during the charging operation in response to the driving signal SPWM.

As an example, the ground switch SW32 may enter an ON state in synchronization with an operation of the first switching element MP1 during a charging operation when the first switching element MP1 enters an ON state. The output switch SW31 may enter an ON state in synchronization with an operation of the second switching operation MN1 of the inverter circuit 210 during a discharging operation when the second switching element MN1 of the inverter circuit 210 enters an ON state.

The load capacitor circuit 240 may include a load capacitor $C_{OUT}$. The load capacitor $C_{OUT}$ may be connected between the output terminal OUT and the second operation voltage (for example, VSS) terminal. In an example, the load capacitor $C_{OUT}$ may be connected between the output terminal OUT and a ground to stabilize a negative voltage $VNE_G$ at the output terminal OUT.

In a non-limiting example, each of the output switch SW31 and the ground switch SW32 of the load switching circuit 230 may include one of a MOS transistor and a diode, which will be described with reference to FIGS. 3 and 4.

Figure 3:
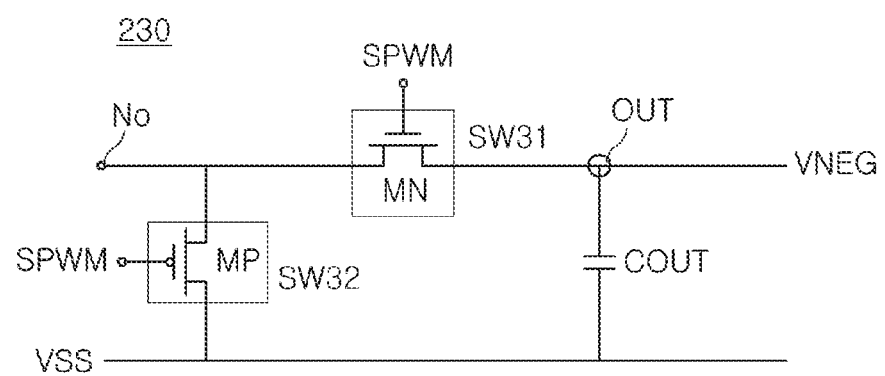
FIG. 3 is a circuit diagram of a load switching circuit in accordance with one or more embodiments.

FIG. 3 is a circuit diagram of a load switching circuit in accordance with one or more embodiments.

Referring to FIG. 3, the output switch SW31 of the load switching circuit 230 may include an NMOS transistor MN having a drain and a source respectively connected between the output node No of the inverter circuit 210 and the output terminal OUT. The NMOS transistor MN may enter an ON state during the charging operation in response to the input of the driving signal SPWM to a gate of the NMOS transistor MN.

The ground switch SW32 of the load switching circuit 230 may include a PMOS transistor MP having a drain and a source connected between the output node No of the inverter circuit 210 and the second operating voltage (for example, VSS) terminal. The PMOS transistor MP may enter an ON state during the charging operation in response to the driving signal SPWM input to a gate of the PMOS transistor MP.

Figure 4:
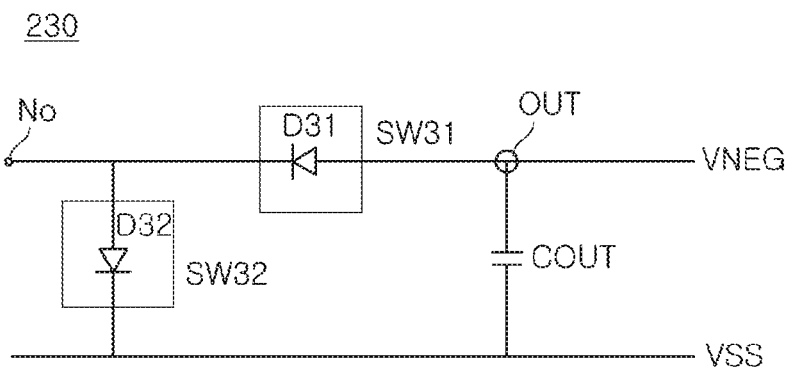
FIG. 4 is another circuit diagram of a load switching circuit in accordance with one or more embodiments.

FIG. 4 is another circuit diagram of a load switching circuit according to an example.

Referring to FIG. 4, the output switch SW31 of the load switching circuit 230 may include a first diode D31 having a cathode, connected to the output node No of the inverter circuit 210, and an anode connected to the output terminal OUT. The first diode D31 may enter an ON state during the charging operation, depending on a difference between a voltage at the output node No and a voltage at the output terminal OUT.

Figure 5:
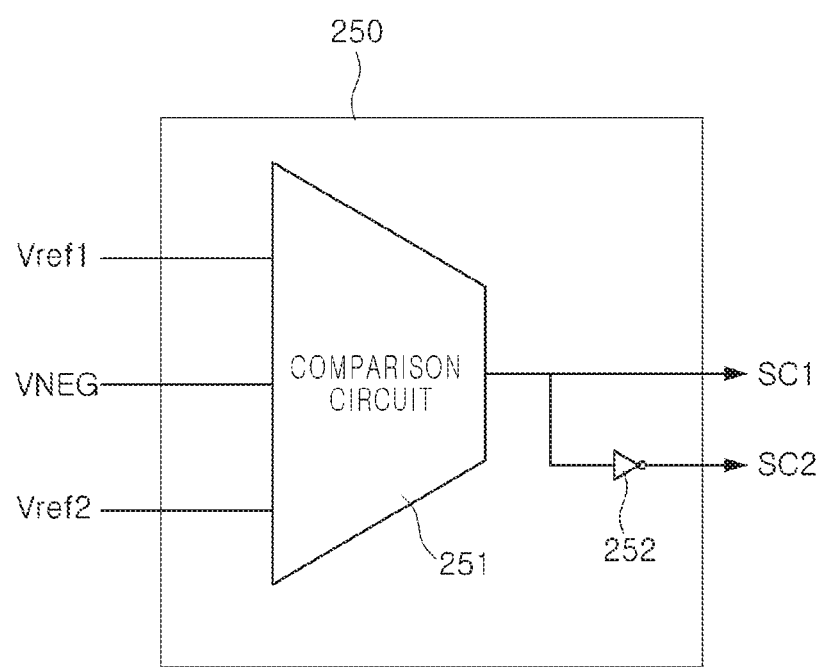
FIG. 5 is a circuit diagram of an operating mode control circuit in accordance with one or more embodiments.
Figure 6:
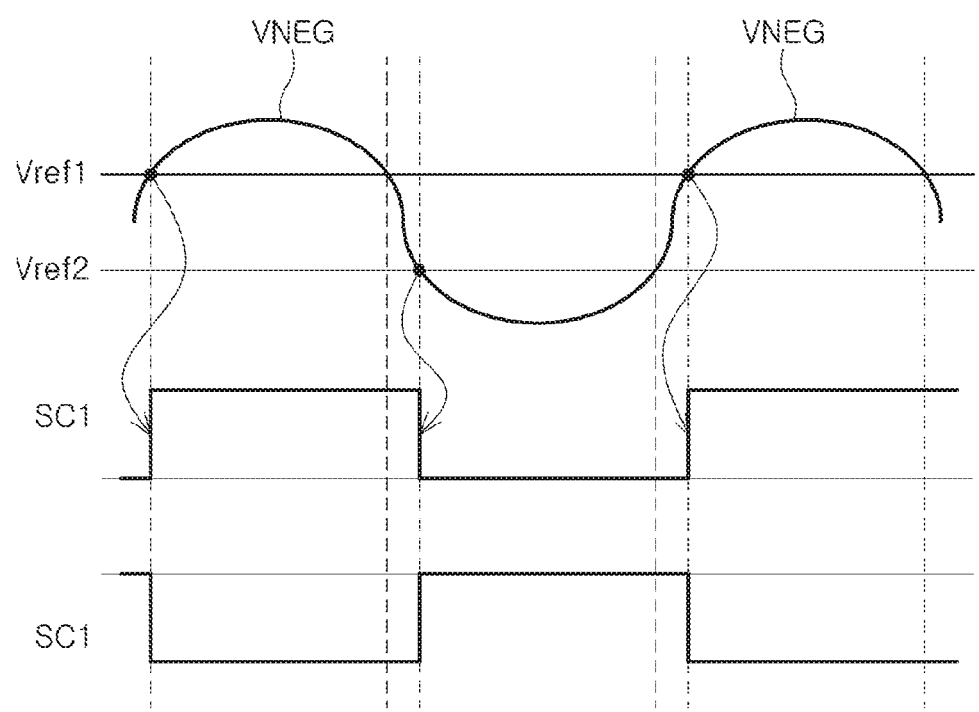
FIG. 6 is a timing diagram of a first control signal and a second control signal of the operating mode control circuit in FIG. 5.

FIG. 5 is a circuit diagram of an operating mode control circuit according to an example, and FIG. 6 is a timing diagram of a first control signal and a second control signal of the operating mode control circuit in FIG. 5.

Referring to FIG. 5, the operating mode control circuit 250 may compare the negative voltage VNEG at the output terminal OUT with a first reference voltage Vref1 and a second reference voltage Vref2, each of the first reference voltage Vref1 and a second reference voltage Vref2 having different voltage levels to each other, to generate a first control single SC1 and a second control signal SC2, out-of-phase signals, and to provide the first and second control signals SC1 and SC2 to the first dual current circuit 221 and the second dual current circuit 222, as illustrated in FIG. 1, to control the start-up mode and the normal operating mode. The operating mode control circuit 250 may respectively control the first dual current circuit 221 and the second dual current circuit 222 illustrated in FIG. 1 based on the respective first and second control signals SC1 and SC2.

Referring to FIGS. 5 and 6, the operating mode control circuit 250 may include a comparison circuit 251 and an inversion circuit 252.

The comparison circuit 251 may generate a first control signal SC1, transitioning from a low level to a high level when the negative voltage VNEG is greater than or equal to the first reference voltage Vref1, and transitioning from a high level to a low level when the negative voltage VNEG is less than or equal to the second reference voltage Vref2. In a non-limiting example, the first reference voltage Vref1 may be higher than the second reference voltage Vref2.

As an example, a low-to-high transition of the first control signal Sc1 may be based on the first reference voltage Vref1, and a high-to-low transition of the first control signal Sc1 may be based on the second reference signal Vref2. Thus, the comparison circuit 251 may serve as a hysteresis comparator.

The inversion circuit 252 may invert the first control signal Sc1 to generate the second control signal Sc2.

Figure 7:
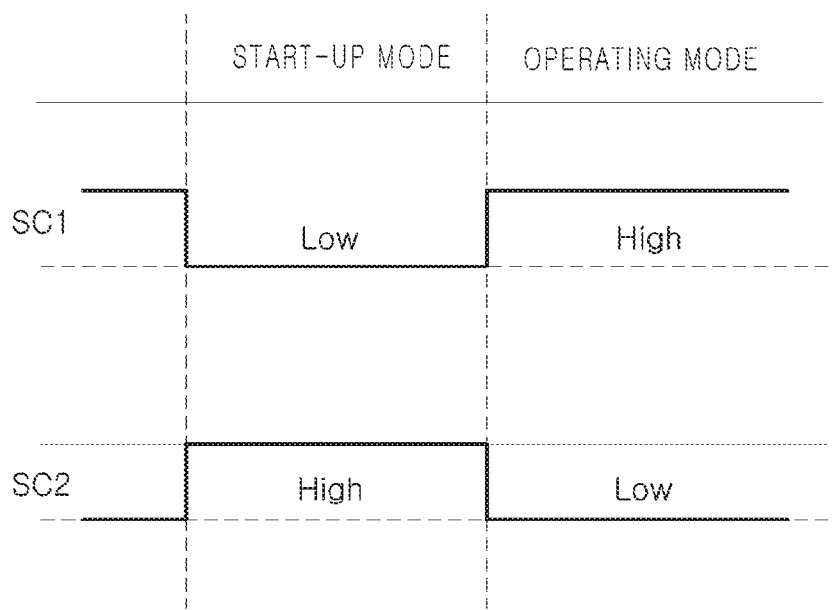
FIG. 7 illustrates a start-up mode and a normal operating mode in accordance with one or more embodiments.

FIG. 7 illustrates a start-up mode and a normal operating mode according to an example.

Referring to FIG. 7, a negative voltage circuit according to an example may perform a start-up mode at the time of initial driving, and then may subsequently perform a normal operating mode.

Referring to FIGS. 6 and 7, the start-up mode may be performed when the negative voltage VNEG is less than a first reference voltage Vref1, and the normal operating mode may be performed when the negative voltage VNEG is greater than the first reference voltage Vref1.

Figure 8:
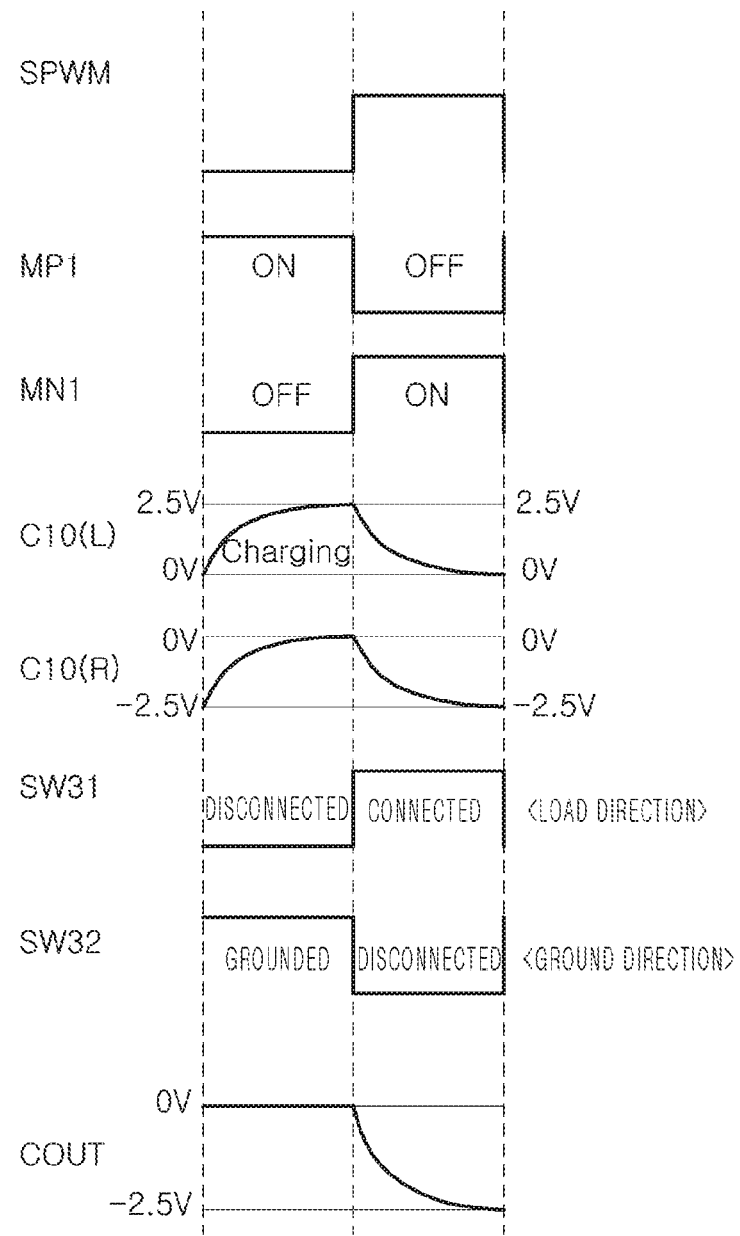
FIG. 8 illustrates an operational timing diagram of a negative voltage circuit for the start-up mode in FIG. 7.
Figure 9:
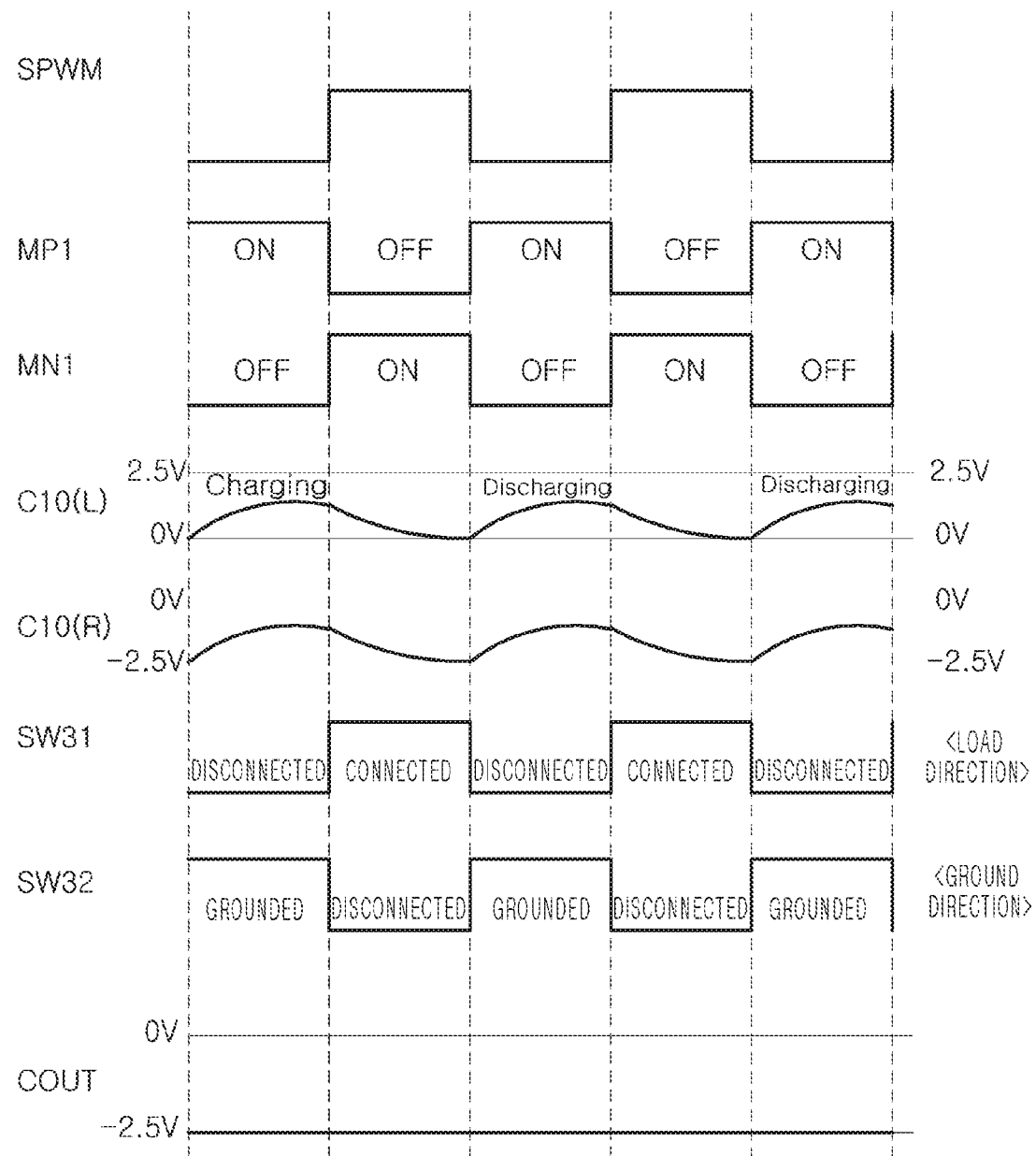
FIG. 9 is an operational timing diagram of a negative voltage circuit for the normal operating mode in FIG. 7.

FIG. 8 is an example of an operational timing diagram of a negative voltage circuit for the start-up mode in FIG. 7, and FIG. 9 is an example of an operational timing diagram of a negative voltage circuit for the normal operating mode in FIG. 7.

Hereinafter, an operation of a negative voltage circuit for a start-up mode will be described with reference to FIGS. 7 and 8.

As a non-limiting example, the driving signal SPWM may be a square wave in which a high level and a low level are repeated. The first switching element MP1 and the second switching element MN1 may repeatedly enter an ON state and an OFF state in response to the driving signal SPWM.

A left voltage C10(L) of the charge capacitor C10 (a voltage at the middle node Nm) may rise, for example, from zero volts (0 V) to 2.5 V during a charging operation, and may fall, for example, from 1.5 V to 0 V during a discharging operation. As an example, charging from 0 V to +2.5 V may be performed for a short period of time by the first current I1, which may be a relatively high current.

A right voltage C10(R) of the charge capacitor C10 (a voltage at an output node No) may rise, for example, from −2.5 V to 0 V during a charging operation, and may fall, for example, from 0 V to −2.5 V during a discharging operation. As an example, discharging from +2.5 V to 0 V may be performed for a short period of time by a third current I3, which may be a relatively high current.

The output switch SW31 may enter an OFF state (that is, be disconnected) during the charging operation in response to the PWM signal SPWM, and may enter an ON state (that is, be connected) during the discharging operation in response to the PWM signal SPWM. The ground switch SW32 may enter an ON state (that is, be grounded) during the charging operation in response to the PWM single SPWM and may enter an OFF state (that is, be disconnected) during the discharging operation in response to the PWM signal SPWM.

Accordingly, a voltage of the load capacitor $C_{OUT}$ may be rapidly converted from 0 V to a negative voltage of −2.5 V.

The operation of the negative voltage circuit for the normal operating mode, described with reference to FIG. 9, may be the same as the operation, described with reference to FIG. 9, except for various differences noted below.

One of the differences between FIG. 8 and FIG. 9 is that the rising speed of each of the left and right voltages C10(L) and C10(R) of the charge capacitor C10 in the start-up mode may be higher (for example, twice higher) than the rising speed of each of the left and right voltages C10(L) and C10(R) of the charge capacitor C10 in the normal operating mode.

Another difference is that the falling speed of each of the left and right voltages C10(L) and C10(R) of the charge capacitor C10 in the start-up mode may be higher (for example, twice higher) than the falling speed of each of the left and right voltages C10(L) and C10(R) of the charge capacitor C10 in the normal operating mode.

Accordingly, a voltage at an output terminal may more rapidly reach a negative voltage in the start-up mode, and then the normal operating mode may be performed to maintain the negative voltage.

Figure 10:
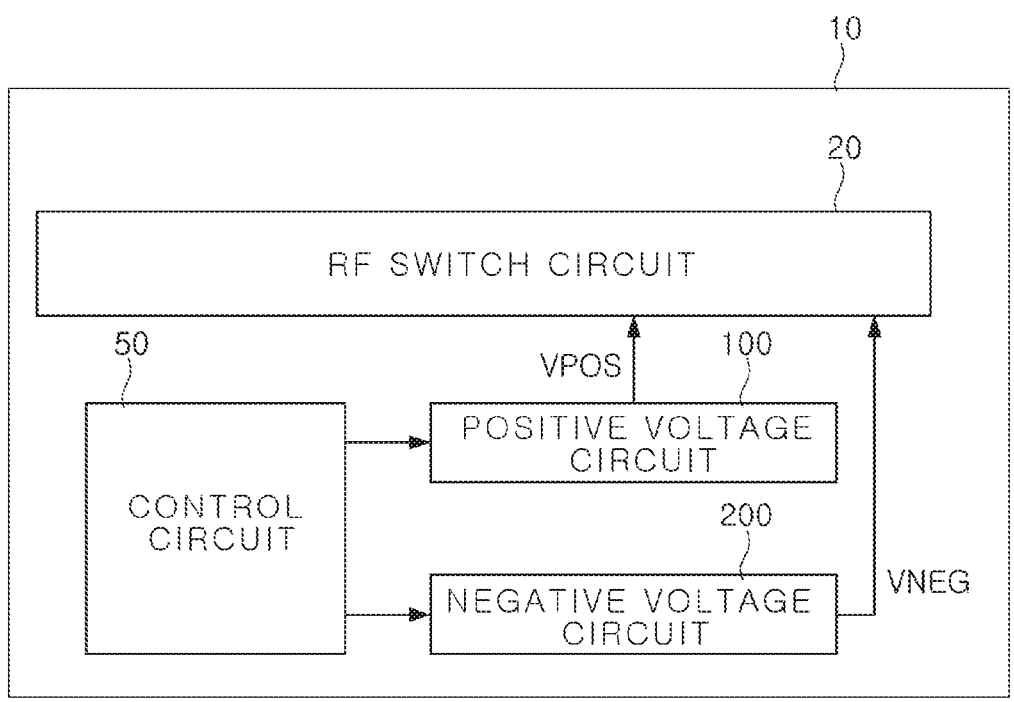
FIG. 10 is an illustrative diagram of application of a negative voltage circuit in accordance with one or more embodiments.

FIG. 10 is an illustrative diagram of the application of a negative voltage circuit according to an example.

Referring to FIG. 10, a negative voltage circuit 200 according to one or more embodiments, may be applied to a radio-frequency (RF) switching device 10.

The RF switching device 10 may include an RF switch circuit 20, a control circuit 50 configured to control supply of a positive voltage VPOS and a negative voltage VNEG, and a positive voltage circuit 100 configured to generate the positive voltage VPOS.

FIG. 10 merely illustrates an example to which the negative voltage circuit 200 is applied, but is not limited thereto.

As described above, according to an example, high current may be supplied in an initial start-up mode to perform high-speed starting, and lower current may be supplied in a normal operating mode than in the initial start-up mode to reduce power consumption. Thus, time of the start-up mode may be reduced to more rapidly reach the normal operating mode.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A negative voltage circuit comprising:
   an inverter circuit configured to perform a charging operation and a discharging operation in response to a driving signal;
   a first dual current circuit connected between the inverter circuit and a first operating voltage terminal, and configured to supply a first current for a charging operation of the inverter circuit based on a start-up mode, and supply a second current for the charging operation of the inverter circuit based on a normal operating mode;
   a second dual current circuit connected between the inverter circuit and a second operating voltage terminal, and configured to supply a third current for a discharging operation of the inverter circuit based on the start-up mode, and supply a fourth current for the discharging operation of the inverter circuit based on the normal operating mode;
   a load switching circuit configured to connect an output node of the inverter circuit to one of an output terminal of the negative voltage circuit and the second operating voltage terminal in response to the driving signal; and
   a load capacitor circuit connected between the output terminal of the negative voltage circuit and a ground, and configured to stabilize a negative voltage at the output terminal.

2. The negative voltage circuit of claim 1, wherein the inverter circuit comprises:
   a first switching element, connected between the first dual current circuit and a middle node of the inverter circuit, and configured to operate in response to the driving signal;
   a second switching element, connected between the middle node of the inverter circuit and the second dual current circuit, and configured to operate with the first switching element in response to the driving signal; and
   a charge capacitor connected between the middle node of the inverter circuit and an output node of the inverter circuit, and configured to perform the charging operation when the first switching element is in an ON state, and configured to perform the discharging operation when the second switching element is in an ON state.

3. The negative voltage circuit of claim 2, wherein the first dual current circuit comprises:

a first start-up mode switch, connected between the first operating voltage terminal and the first switching element, and configured to enter an ON state during the charging operation in the start-up mode to supply the first current to the inverter circuit; and
   a first operating mode switch, connected in parallel to the first driving mode switch, and configured to enter an ON state during the charging operation in the normal operating mode to supply the second current to the inverter circuit,
   wherein the second current is lower than the first current.

4. The negative voltage circuit of claim 3, wherein the second dual current circuit comprises:
   a second start-up mode switch, connected between the second switching element and the second operating voltage terminal, and configured to enter an ON state during the discharging operation in the start-up mode to supply the third current between the inverter circuit and the second operating voltage terminal; and
   a second normal operating mode switch, connected in parallel with the second start-up mode switch, and configured to enter an ON state during the discharging operation in the normal operating mode to supply the fourth current between the inverter circuit and the second operating voltage terminal,
   wherein the fourth current is lower than the third current.

5. The negative voltage circuit of claim 4, wherein the load switching circuit comprises:
   an output switch connected between the output node of the inverter circuit and the output terminal, and configured to enter an ON state during the charging operation; and
   a ground switch connected between the output node of the inverter circuit and the second operating voltage terminal, and configured to enter an ON state during the charging operation.

6. The negative voltage circuit of claim 5, wherein the load capacitor circuit comprises a load capacitor connected between the output terminal and a ground, and is configured to stabilize a negative voltage at the output terminal.

7. The negative voltage circuit of claim 6, wherein each of the output switch of the load switching circuit and the ground switch of the load switching circuit comprises one of a Metal-oxide Semiconductor (MOS) transistor and a diode.

8. A negative voltage circuit comprising:
   an inverter circuit configured to perform a charging operation and a discharging operation in response to a driving signal;
   a first dual current circuit connected between the inverter circuit and a first operating voltage terminal, and configured to supply a first current for a charging operation of the inverter circuit based on a start-up mode, and supply a second current for the charging operation of the inverter circuit based on a normal operating mode;
   a second dual current circuit connected between the inverter circuit and a second operating voltage terminal to and configured to supply a third current for a discharging operation of the inverter circuit based on the start-up mode, and supply a fourth current for the discharging operation of the inverter circuit based on the normal operating mode;
   a load switching circuit configured to connect an output node of the inverter circuit to one of an output terminal of the negative voltage circuit and the second operating voltage terminal in response to the driving signal;

a load capacitor circuit connected between the output terminal of the negative voltage circuit and a ground, and configured to stabilize a negative voltage at the output terminal; and an operating mode control circuit configured to control the first dual current circuit and the second dual current circuit in response to the negative voltage at the output terminal.

9. The negative voltage circuit of claim 8, wherein the inverter circuit comprises:

a first switching element, connected between the first dual current circuit and a middle node of the inverter circuit, and configured to operate in response to the driving signal;

a second switching element, connected between the middle node of the inverter circuit and the second dual current circuit, and configured to operate with the first switching element in response to the driving signal; and a charge capacitor connected between the middle node of the inverter circuit and the output node of the inverter, and configured to perform the charging operation when the first switching element is in an ON state, and configured to perform the discharging operation when the second switching element is in an ON state.

10. The negative voltage circuit of claim 9, wherein the first dual current circuit comprises:

a first start-up mode switch, connected between the first operating voltage terminal and the first switching element, and configured to enter an ON state in response to the driving signal during the charging operation in the start-up mode to supply the first current to the inverter circuit; and a first operating mode switch, connected in parallel with the first driving mode switch, and configured to enter an ON state in response to the driving signal during the charging operation in the normal operating mode to supply the second current to the inverter circuit, wherein the second current is lower than the first current.

11. The negative voltage circuit of claim 10, wherein the second dual current circuit comprises:

a second start-up mode switch, connected between the second switching element and the second operating voltage terminal, and configured to enter an ON state in response to the driving signal during the discharging operation in the start-up mode to supply the third current between the inverter circuit and the second operating voltage terminal; and a second normal operating mode switch, connected in parallel with the second start-up mode switch, and configured to enter an ON state in response to the driving signal during the discharging operation in the normal operating mode to supply the fourth current between the inverter circuit and the second operating voltage terminal, wherein the fourth current is lower than the third current.

12. The negative voltage circuit of claim 11, wherein the load switching circuit comprises:

an output switch connected between the output node of the inverter circuit and the output terminal, and configured to enter an ON state during the charging operation; and a ground switch connected between the output node of the inverter circuit and the second operating voltage terminal, and configured to enter an ON state during the charging operation.

13. The negative voltage circuit of claim 12, wherein the load capacitor circuit comprises a load capacitor connected between the output terminal and a ground, and is configured to stabilize a negative voltage at the output terminal.

14. The negative voltage circuit of claim 13, wherein the operating mode control circuit is configured to:

compare the negative voltage at the output terminal with a first reference voltage and a second reference voltage, each of the first reference voltage and the second reference voltage having different voltage levels to each other, generate a first control signal and a second control signal, out-of-phase signals, and provide the first control signal and the second control signal to the first dual current circuit and the second dual current circuit to control the start-up mode and the normal operating mode.

15. The negative voltage circuit of claim 14, wherein the operating mode control circuit comprises:

a comparison circuit configured to generate a first control signal that transitions from a low level to a high level when the negative voltage is greater than or equal to the first reference voltage, and that transitions from a high level to a low level when the negative voltage is less than or equal to the second reference voltage; and an inversion circuit configured to invert the first control signal to generate the second control signal.

16. The negative voltage circuit of claim 15, wherein each of the output switch and the ground switch of the load switch circuit comprises any one of a Metal-oxide Semiconductor (MOS) transistor and a diode.

17. A negative voltage circuit comprising:

an oscillator configured to provide a driving signal;

a first dual current circuit configured to supply a first current to perform a charging operation based on a start-up mode and supply a second current to perform the charging operation based on a normal operation mode;

a second dual current circuit configured to supply a third current to perform a discharging operation based on the start-up mode, and supply a fourth current to perform the discharging operation based on the normal operation mode; and an operating mode controlling circuit comprising a hysteresis comparator configured to generate a first control signal, and an inversion circuit configured to generate a second control signal based on the first control signal;

wherein the first control signal and the second control signal are provided to the first dual current circuit and the second dual current circuit to control the start-up mode and the normal operation mode.

18. The negative voltage circuit of claim 17, wherein the first control signal transitions from a low level to a high level when a negative voltage is greater than or equal to a first reference voltage, and transitions from a high level to a low level when the negative voltage is less than or equal to a second reference voltage.

* * * * *